United States Patent
Lin et al.

(10) Patent No.: US 7,274,357 B2
(45) Date of Patent: Sep. 25, 2007

(54) TOUCH PAD MODULE INCLUDING SEPARATE TOUCH PAD AND CONTROL CIRCUIT UNITS

(75) Inventors: Jao-Ching Lin, Hsin-Chuang (TW); Shyh-In Hwang, Hsin-Chuang (TW); Lin Chu, Hsin-Chuang (TW); Chung-Yi Shen, Hsin-Chuang (TW)

(73) Assignee: Sentelic Corporation (TW)

( * ) Notice: Subject to any disclaimer, the term of this patent is extended or adjusted under 35 U.S.C. 154(b) by 455 days.

(21) Appl. No.: 10/782,197

(22) Filed: Feb. 19, 2004

(65) Prior Publication Data

US 2005/0134558 A1 Jun. 23, 2005

(30) Foreign Application Priority Data

Dec. 19, 2003 (CN) .................. 2003 1 0121522

(51) Int. Cl.
*G09G 5/00* (2006.01)
(52) U.S. Cl. .................. 345/173; 345/204; 345/211; 345/175; 345/179
(58) Field of Classification Search ........ 345/173–179, 345/156–159, 169, 901; 178/18.01–18.03, 178/18.07, 19.03, 20.01; 323/218, 211; 382/124; 438/669; 340/649; 396/56
See application file for complete search history.

(56) References Cited

U.S. PATENT DOCUMENTS

| | | | | |
|---|---|---|---|---|
| 4,827,085 A * | 5/1989 | Yaniv et al. ................. | 345/174 |
| 5,329,650 A * | 7/1994 | Zaccai et al. ................. | 4/605 |
| 5,663,633 A * | 9/1997 | Kahn et al. ................. | 323/218 |
| 5,666,106 A * | 9/1997 | Nasman ................. | 340/649 |
| 5,920,310 A * | 7/1999 | Faggin et al. ................. | 345/173 |
| 6,608,617 B2 * | 8/2003 | Hoffknecht et al. ......... | 345/173 |
| 7,066,415 B2 * | 6/2006 | Strutz ................. | 241/36 |
| 2002/0089493 A1 | 7/2002 | Hong | |
| 2004/0252867 A1* | 12/2004 | Lan et al. ................. | 382/124 |
| 2005/0020062 A1* | 1/2005 | Caldwell et al. ............ | 438/669 |
| 2005/0073507 A1* | 4/2005 | Richter et al. .............. | 345/174 |
| 2006/0192771 A1* | 8/2006 | Rosenberg et al. ......... | 345/173 |
| 2007/0086764 A1* | 4/2007 | Konicek ................. | 396/56 |

FOREIGN PATENT DOCUMENTS

| | | |
|---|---|---|
| CN | 1097224 C | 12/2002 |
| CN | 1245823 C | 3/2006 |
| CN | 1302367 C | 2/2007 |
| GB | 2348337 | 9/2000 |
| WO | WO94/25916 | 11/1994 |

* cited by examiner

*Primary Examiner*—Bipin Shalwala
*Assistant Examiner*—Prabodh Dharia
(74) *Attorney, Agent, or Firm*—Brinks Hofer Gilson & Lione

(57) ABSTRACT

A touch pad module includes a touch pad unit for generating contact signals in response to operation thereof, a control circuit unit separate from the touch pad unit, and an electrical coupling unit having a first end coupled to the touch pad unit and a second end coupled to the control circuit unit. The electrical coupling unit permits transmission of the contact signals generated by the touch pad unit to the control circuit unit.

5 Claims, 3 Drawing Sheets

TOUCH PAD MODULE INCLUDING SEPARATE TOUCH PAD AND CONTROL CIRCUIT UNITS

CROSS-REFERENCE TO RELATED APPLICATION

This application claims priority of Chinese Appln. No. 200310121522.9, filed on Dec. 19, 2003.

BACKGROUND OF THE INVENTION

1. Field of the Invention

The invention relates to a touch pad module, more particularly to a touch pad module that includes a touch pad unit separate from a control circuit unit.

2. Description of the Related Art

Various types of touch pads, such as capacitive, resistive, light-sensitive, sound-responsive, etc., are known in the art. Touch pads are usually integrated into electronic devices, such as notebook computers, personal digital assistants, etc. When used in combination with a touch pen, the touch pad can serve as an input device for inputting text. Moreover, with the use of a finger moving on the surface of the touch pad, the touch pad can have the cursor control, item selection and window scrolling functions of a computer mouse.

For a capacitive touch pad, the operating principle thereof is as follows: Finger position is sensed by virtue of the capacitance of the human body. Particularly, at the instant a finger touches the touch pad, a contact capacitance is generated at the surface of the touch pad. Because the surface of the touch pad is formed into a sensing array, and because the touch pad is connected to a control circuit, the control circuit is able to continuously track the finger contact capacitance and to generate position information corresponding to (X, Y) coordinates of the finger contact position. Moreover, since the touch pad is pressure-sensitive, a Z-coordinate of the finger contact position can be determined by the control circuit in accordance with the amount of finger pressure applied to the touch pad.

FIGS. 1 to 3 illustrate a conventional capacitive touch pad module 9 installed in notebook computers. The known touch pad module 9 includes a circuit board 91 and a touch pad unit 92 overlying the circuit board 91. The touch pad unit 92 includes a dielectric layer 921 and a sensing layer 922 disposed between the dielectric layer 921 and the circuit board 91. The circuit board 91 has a first surface adhered to the sensing layer 922 of the touch pad unit 92, and a second surface mounted with a control chip 911 and formed with circuit traces 912. The circuit traces 912 on the circuit board 91 are coupled electrically to the touch pad unit 92 using conductive vias 913. The modular configuration of the touch pad module 9 facilitates mass production and installation on electronic devices.

However, the size of the touch pad module 9 cannot be reduced further in view of physical limitations imposed by the control chip 911 and the circuit traces 912. Moreover, because the touch pad unit 92 is mounted directly on the circuit board 91, which is required to be rigid so as to be able to permit mounting of the control chip 911 and formation of the circuit traces 912 thereon, the conventional touch pad module 9 has a flat configuration and is not suitable for application to curved or rounded surfaces of casings of electronic devices.

SUMMARY OF THE INVENTION

Therefore, the object of the present invention is to provide a touch pad module that is suitable for application to electronic devices, that includes a touch pad unit separate from a control circuit unit, and that can overcome the aforesaid drawbacks of the prior art.

According to the present invention, a touch pad module includes a touch pad unit for generating contact signals in response to operation thereof, a control circuit unit separate from the touch pad unit, and an electrical coupling unit having a first end coupled to the touch pad unit and a second end coupled to the control circuit unit. The electrical coupling unit permits transmission of the contact signals generated by the touch pad unit to the control circuit unit.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
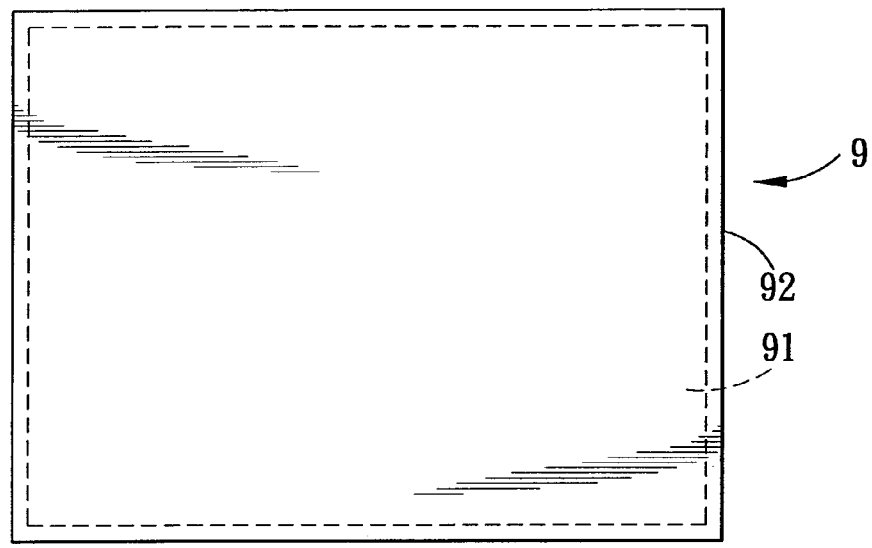
FIG. 1 is a schematic top view, illustrating a touch pad unit of a conventional touch pad module.
Figure 2:
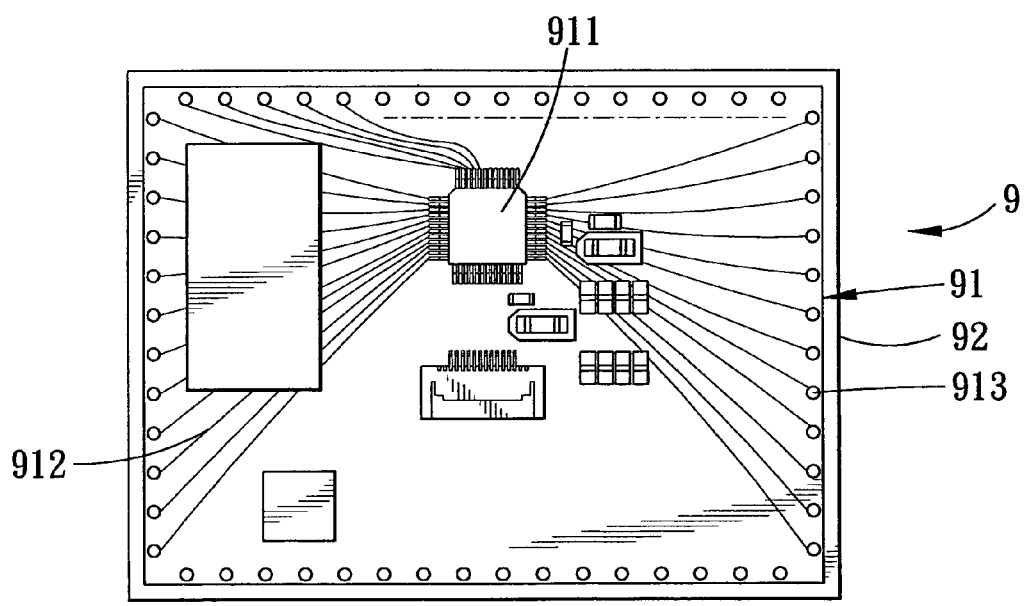
FIG. 2 is a schematic bottom view, illustrating a circuit board of the conventional touch pad module.
Figure 3:
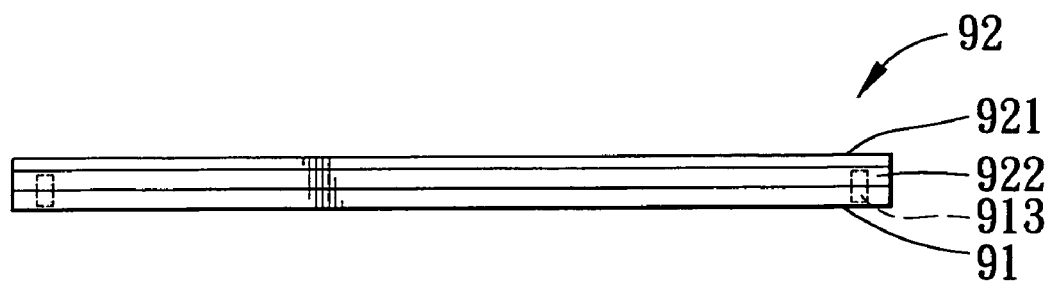
FIG. 3 is a schematic side view to illustrate the conventional touch pad module.
Figure 4:
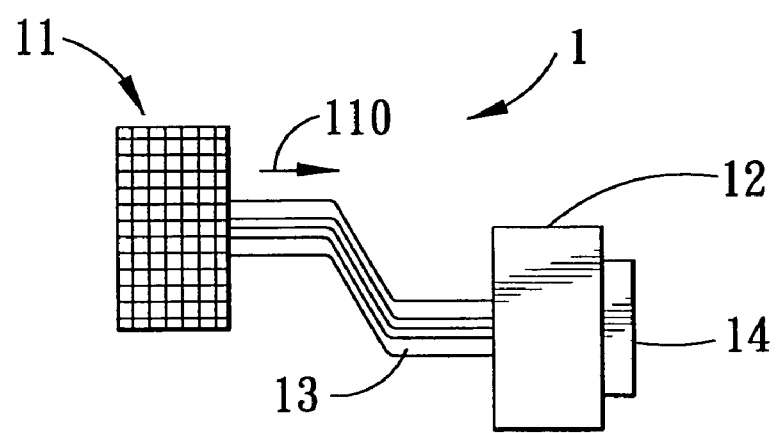
FIG. 4 is a schematic view to illustrate the preferred embodiment of a touch pad module according to the present invention.

Referring to FIG. 4, the preferred embodiment of a touch pad module 1 according to the present invention is shown to comprise a touch pad unit 11, a control circuit unit 12 separate from the touch pad unit 11, and an electrical coupling unit 13 having a first end coupled to the touch pad unit 11 and a second end coupled to the control circuit unit 12. The touch pad unit 11 can be operated using a finger (not shown) or a touch pen (not shown), and generates contact signals 110 in response to operation thereof in a conventional manner. The electrical coupling unit 13 permits transmission of the contact signals 110 generated by the touch pad unit 11 to the control circuit unit 12.

Figure 5:
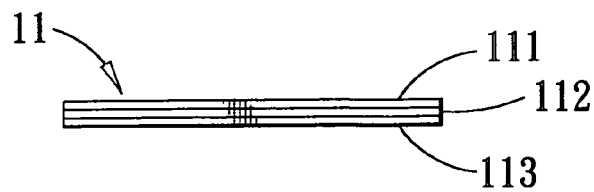
FIG. 5 is a schematic side view, illustrating a touch pad unit of the preferred embodiment.

With further reference to FIG. 5, the touch pad unit 11 includes a dielectric layer 111 and a sensing layer 112 formed on a lower surface of the dielectric layer 111. When pressure is applied to an upper operating surface of the dielectric layer 111, the sensing layer 112 generates the corresponding contact signals 110, which are subsequently transmitted to the control circuit unit 12 through the electrical coupling unit 13. Preferably, a protective layer 113 is formed on one side of the sensing layer 112 opposite to the dielectric layer 111. The sensing layer 112 is thus disposed between the protective layer 113 and the dielectric layer 111 to protect the sensing layer 112 from damage.

Figure 6:
FIG. 6 is a schematic side view, illustrating a touch pad unit of a modified preferred embodiment.

Referring to FIG. 6, in a modified embodiment, the touch pad unit 11 further includes a metal layer 114 formed on one side of the protective layer 113 opposite to the sensing layer 112. The metal layer 114 can serve as a grounding layer or can cooperate with the sensing layer 112 to form a capacitor. Preferably, each of the dielectric layer 111 and the protective layer 113 is made of a flexible material. Preferably, the flexible material is a resin material, such as polyester. Hence, the touch pad unit 11 can be flexed for application to curved or non-flat surfaces.

Referring once again to FIG. 4, the sensing layer 112 is constructed as a sensing array. The sensing array has a plurality of contact points from which the contact signals 110 are outputted. The electrical coupling unit 13 is flexible and is preferably a ribbon cable. The number of lines in the ribbon cable corresponds to the number of contact points of the sensing array.

Moreover, the touch pad module 1 further includes a transmission interface 14 coupled to the control circuit unit 12. In use, the control circuit unit 12 converts the contact signals 110 received thereby into corresponding position information that is transmitted to relevant circuitry of an electronic device through the transmission interface 14.

Figure 7:
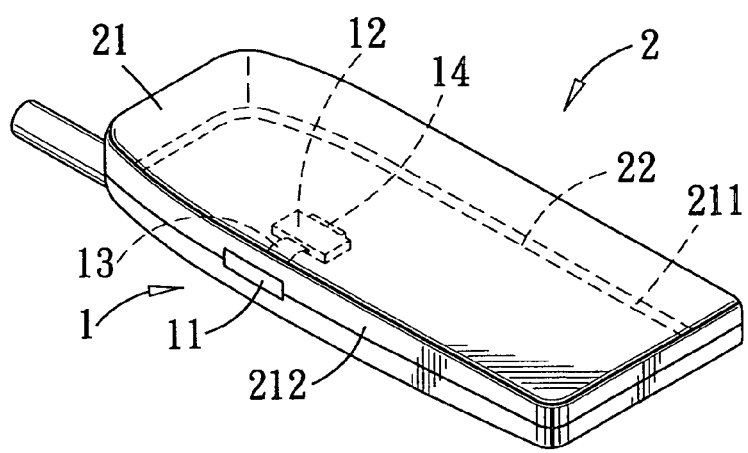
FIG. 7 is a perspective view, illustrating an electronic device that incorporates the touch pad module according to this invention.

FIG. 7 illustrates an electronic device 2 that incorporates the touch pad module 1. The electronic device 2 includes a casing 21 and a main board 22 mounted in the casing 21. The casing 21 includes a base wall 211 and a peripheral wall 212 extending from a periphery of the base wall 211 and having the touch pad unit 11 of the touch pad module 1 mounted thereon. The dielectric layer 111 (see FIGS. 5 and 6) of the touch pad unit 11 faces outwardly when the latter is mounted on the casing 21. The control circuit unit 12 is coupled electrically to the main board 22, which is mounted on the base wall 211, via the transmission interface 14. The electrical coupling unit 13 extends through the peripheral wall 212 to connect with the touch pad unit 11.

In the touch pad module 1 of this invention, since the touch pad unit 11 is separate from the control circuit unit 12, the control circuit unit 12 does not impose minimum size restrictions on the touch pad unit 11. The touch pad unit 11 can thus be applied to peripheral walls 212 of casings 21 of electronic devices 2, such as mobile telephones and personal digital assistants. Hence, single-tap, double-tap, or tap-and-drag activity of the touch pad module 1 can be used to replace push buttons or rotary knobs commonly found in the electronic devices 2 for the purpose of volume control and the like, thereby enhancing consumer appeal of the electronic devices 2.

Moreover, because the touch pad unit 11 is separate from the control circuit unit 12 and is connected to the control circuit unit 12 through the electrical coupling unit 13, and because the touch pad unit 11 is flexible, the touch pad unit 11 is suitable for application to curved or non-flat surfaces of casings 21 of electronic devices 2.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

| NAME | Reg. No. |
| --- | --- |
| Addy, Meredith Martin | 37,883 |
| Almeda, L. G. | 46,151 |
| AuBuchon, F. David | 20,493 |

-continued

| NAME | Reg. No. |
| --- | --- |
| Badger, David | 22,597 |
| Belvis, Glen P. | 31,735 |
| Benson, Joel W. | 29,002 |
| Bentley, Dwayne | 45,947 |
| Berenzweig, Jack C. | 24,569 |
| Blanchard, Jonathan M. B. | 48,927 |
| Bluestone, David H. | 44,542 |
| Brinks, Henry L. | 17,013 |
| Buchanan, Matt | 47,459 |
| Carpenter, Robert N. | 40,409 |
| Chu, Michael P. | 37,112 |
| Clark, Richard K. | 40,560 |
| Collins, James A. | 43,557 |
| Cox, Jeffrey | 42,445 |
| Curtis, Anthony P. | 46,193 |
| Daniel, Rodney A. | 31,605 |
| Delaney, Timothy Q. | 33,674 |
| Dockrey, Jasper W. (Bill) | 33,868 |
| Duncan, Jeffery M. | 31,609 |
| Fekete, Doug | 29,065 |
| Filarski, Thomas J. | 31,612 |
| Frankel, William H. | 30,337 |
| Freeman, John C. | 34,483 |
| Gabric, Ralph J. | 34,167 |
| Gauri, Vineet | 44,701 |
| Genin, Kent E. | 37,834 |
| Gnoffo, Vincent J. | 44,714 |
| Green, Raymond W. | 24,587 |
| Harkins, Christopher A. | 48,775 |
| Heffner, Anastasia | 47,638 |
| Hetz, Joseph F. | 41,070 |
| Hillis, Sanders N. | 45,712 |
| Hofer, Roy E. | 19,391 |
| Horie, Tadashi | 40,437 |
| Jacover, Jerold A. | 26,284 |
| Jager, Melvin F. | 22,131 |
| Johnson, Harold V. | 31,972 |
| Kaplan, Richard A. | 30,563 |
| Katz, James L. | 42,711 |
| Klintworth, Timothy K. | 46,162 |
| Lane, Bradley G. | 33,411 |
| Lione, Richard G. | 19,795 |
| Lucas, John K. | 27,024 |
| Lucier, Timothy P. | 44,882 |
| Mallin, Robert S. | 35,596 |
| McConnell, Dean E. | 44,916 |
| McMahon, Charles M. | 44,926 |
| Michael, Carmen Matos | 47,793 |
| Miller, Laura Beth | 37,680 |
| Milz, Michael E. | 34,880 |
| Mrksich, K. Shannon | 36,675 |
| Murray, David D. | 28,647 |
| Murray, John | 44,251 |
| Naughton, James P. | 30,665 |
| Nichols, G. Peter | 34,401 |
| Nichols, Jeffry M. | 46,958 |
| Oberholtzer, Steven | 30,670 |
| Odar, Helen A. | 32,806 |
| Okey, David | 42,959 |
| Pioli, Janet A. | 35,323 |
| Prendergast, William F. | 34,699 |
| Rand, Justin B. | 48,552 |
| Rauch, John G. | 37,218 |
| Remus, Mark H. | 40,141 |
| Richards, Marc V. | 37,921 |
| Richardson, James A. | 26,983 |
| Ropski, Gary M. | 28,257 |
| Schein, Dan B. | 33,551 |
| Shoup, Guy W. | 26,805 |
| Shurtz, Steven P. | 31,424 |
| Siller, Jr., Gustavo | 32,305 |
| Sobieraj, James R. | 30,805 |
| Sosenko, Eric | 34,440 |
| Springman, Sean P. | 48,415 |
| Stanley, Jr., Richard E. | 45,662 |
| Sternstein, Allan J. | 27,396 |
| Steward, Lawrence A. | 32,309 |

-continued

| NAME | Reg. No. |
| --- | --- |
| Stover, Andrew D. | 38,629 |
| Subramaniam, Sujatha | 48,739 |
| Summerfield, Craig A. | 37,947 |
| Tabor, Katherine L. | 36,026 |
| Taylor, Jonathan P. | 48,338 |
| Vivacqua, Ray | 45,369 |
| Weiss, Mark D. | 48,826 |
| White, Jason C. | 42,223 |
| Zanfardino, Dominic P. | 36,068 |
| Zayia, Gregory H. | 48,059 |

We claim:

1. A palm held electronic device having a touch pad function, comprising:
   a casing including a base wall, and a peripheral wall extending from a periphery of said base wall;
   a main board disposed in said casing and mounted on said base wall of said casing; and
   a touch pad module including:
      a flexible touch pad unit mounted flexibly on said peripheral wall, said touch pad unit generating contact signals in response to operation thereof;
      a control circuit unit separate from said touch pad unit, disposed in said casing, and coupled electrically to said main board, said control circuit unit receiving the contact signals and recognizing the contact signals as at least one of push button signals and volume control signals; and
      an electrical coupling unit disposed in said casing and having a first end coupled to said touch pad unit and a second end coupled to said control circuit unit, said electrical coupling unit extending through said peripheral wall to be connected with said touch pad unit, said electrical coupling unit permitting transmission of the contact signals generated by the touch pad unit to said control circuit unit.

2. The electronic device of claim 1, wherein said electrical coupling unit is a ribbon cable.

3. A handheld electronic device having a touch pad function, comprising:
   a casing including a base wall, and a peripheral wall extending from a periphery of said base wall;
   a main board disposed in said casing and mounted on said base wall of said casing; and
   a touch pad module including:
      a flexible touch pad unit mounted flexibly on said peripheral wall, said touch pad unit generating contact signals in response to operation thereof,
      a control circuit unit separate from said touch pad unit and separate from said main board, disposed in said casing, and coupled electrically to said main board,
      an electrical coupling unit disposed in said casing and having a first end coupled to said touch pad unit and a second end coupled to said control circuit unit, said electrical coupling unit extending through said peripheral wall to be connected with said touch pad unit, said electrical coupling unit permitting transmission of the contact signals generated by the touch pad unit to said control circuit unit, and
      a transmission interface electrically coupling said control circuit unit to said main board.

4. The handheld electronic device of claim 3, wherein said control circuit unit receives the contact signals and recognizes the contact signals as at least one of push button signals and volume control signals.

5. The handheld electronic device of claim 4, wherein said electrical coupling unit is a ribbon cable.

* * * * *